(12) United States Patent
Glick et al.

(10) Patent No.: US 12,021,870 B2
(45) Date of Patent: Jun. 25, 2024

(54) SECURE COMMUNICATION BETWEEN DIFFERENT AGENCIES IN AN INCIDENT AREA

(71) Applicant: MOTOROLA SOLUTIONS, INC., Chicago, IL (US)

(72) Inventors: Mordechai Glick, Petah Tikva (IL); Bartosz Kwiecinski, Cracow (PL); Pawel Niemiec, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 457 days.

(21) Appl. No.: 17/444,750

(22) Filed: Aug. 10, 2021

(65) Prior Publication Data

US 2023/0046237 A1    Feb. 16, 2023

(51) Int. Cl.
| | | |
|---|---|---|
| *H04L 9/40* | (2022.01) | |
| *G06V 20/10* | (2022.01) | |
| *G06V 20/52* | (2022.01) | |
| *H04L 9/08* | (2006.01) | |
| *H04N 7/18* | (2006.01) | |
| *G06F 18/24* | (2023.01) | |
| *H04N 23/69* | (2023.01) | |
| *H04N 23/695* | (2023.01) | |

(52) U.S. Cl.
CPC .............. *H04L 63/10* (2013.01); *G06V 20/10* (2022.01); *G06V 20/52* (2022.01); *H04L 9/0819* (2013.01); *H04L 9/085* (2013.01); *H04L 63/20* (2013.01); *H04N 7/185* (2013.01); *G06F 18/24* (2023.01); *H04N 23/69* (2023.01); *H04N 23/695* (2023.01)

(58) Field of Classification Search
CPC ....... H04L 63/10; H04L 63/20; H04L 9/0819; H04L 9/085
USPC ........................................................ 713/168
See application file for complete search history.

(56) References Cited

U.S. PATENT DOCUMENTS

| | | |
|---|---|---|
| 7,143,289 B2 | 11/2006 | Denning et al. |
| 8,503,718 B2 | 8/2013 | Muriello et al. |
| 9,715,619 B2 | 7/2017 | Muriello et al. |

(Continued)

FOREIGN PATENT DOCUMENTS

| | | |
|---|---|---|
| IE | 20140143 A1 | 12/2015 |
| WO | 2020076720 A1 | 4/2020 |

OTHER PUBLICATIONS

Haj Seyyed Javadi, Hamid. (2012). Using image as cipher key in AES. International Journal of Computer Science Issues. 9.

*Primary Examiner* — Anthony D Brown

(57) ABSTRACT

Secure communication in a geographic incident area is disclosed. Computer-implemented methods are also disclosed, one of which is for restricting access to a resource and includes generating a key and splitting it into N key parts (where N is an integer greater than two). The method also includes encrypting the N key parts. The method also includes transmitting, over a network, to a device: the N encrypted key parts; and identifying information for N secret objects expected to be visible within the area. Each of the N encrypted key parts is decryptable based on at least one video analytics-discernable object attribute for each respective secret object of the N secret objects. The method also includes allowing an additional entity to access the resource only by presentation of a complete key formed from decrypted versions of less than all of the N key parts.

17 Claims, 5 Drawing Sheets

(56) References Cited

U.S. PATENT DOCUMENTS

2017/0193206 A1     7/2017   Vadlamudi
2020/0119917 A1*   4/2020   Christensen .......... H04L 9/3239

* cited by examiner

SECURE COMMUNICATION BETWEEN DIFFERENT AGENCIES IN AN INCIDENT AREA

BACKGROUND

Sometimes two or more different agencies may be working contemporaneously within a same incident area. For example, both a federal law enforcement agency and a state law enforcement agency may each be tasked with working in a same geographic location where an incident has occurred. Although it may be easy for employees/officers of a same agency to communicate securely amongst each other, there may not be a convenient or easy way to have inter-communications between the two or more different agencies. Therefore, it may end up becoming quite complicated, time consuming and/or expensive to achieve security for the desired inter-messaging between the two or more different agencies. Also the same may be the case for securely sharing non-messaging related resources between the two or more different agencies.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
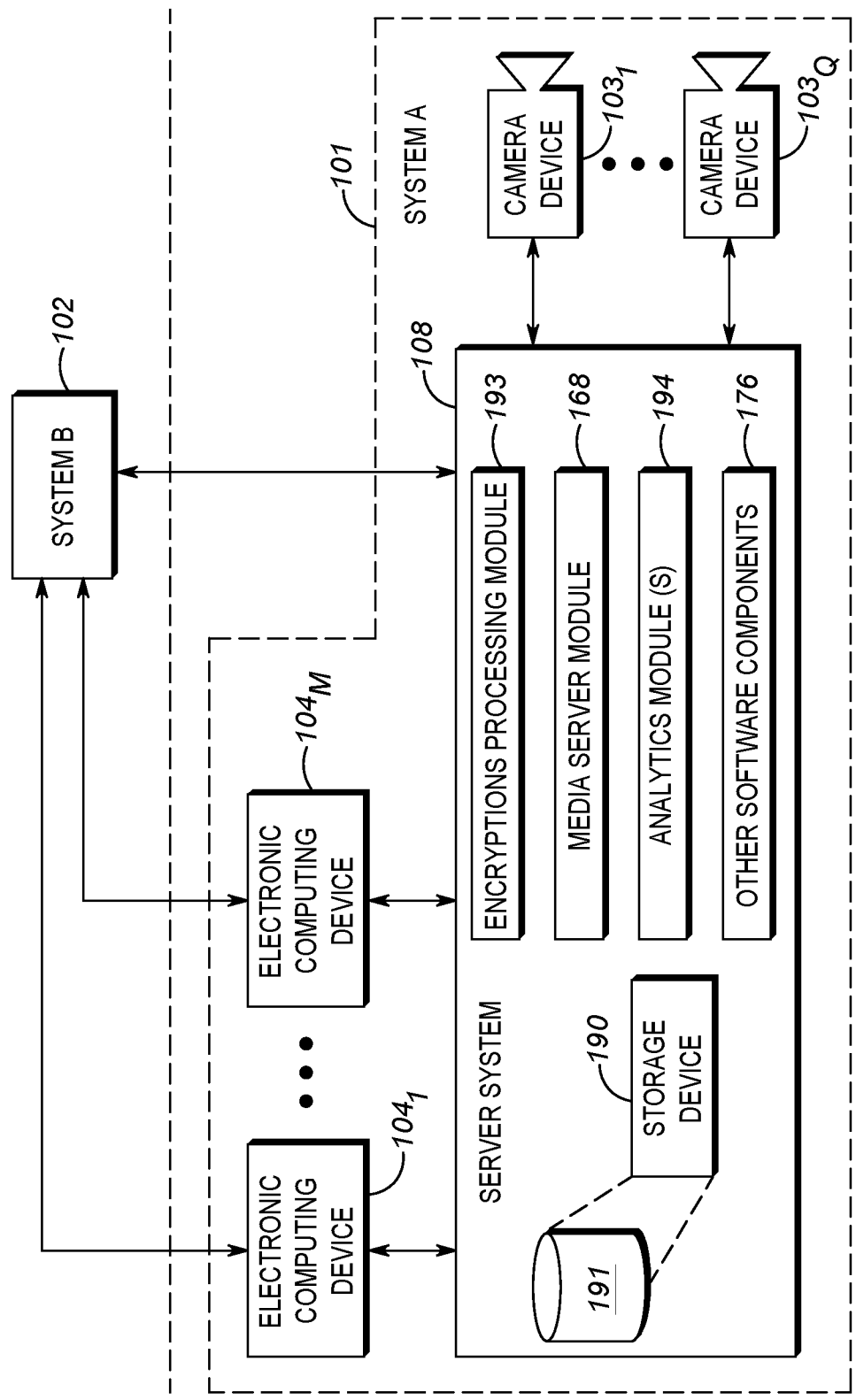
FIG. 1 is a block diagram of communicatively connected systems within which methods in accordance with example embodiments can be carried out.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

According to one example embodiment, there is provided a computer-implemented method that includes receiving, at an input of a network-addressable device, identifying information for a plurality of secret objects expected to be visible within a geographic incident area. The network-addressable device forms a part of a system at least partly controlled by a first entity that includes the network-addressable device and at least one camera. The computer-implemented method also includes operating the at least one camera to capture at least one image of at least some of the secret objects. The computer-implemented method also includes carrying out analytics on the captured at least one image to obtain a plurality of sets of object attributes. Each set includes at least one object attribute for each of a corresponding one of the at least some of the secret objects. The computer-implemented method also includes, for each of the sets of object attributes: obtaining an unverified key part via decryption using the respective set, and verifying whether the unverified key part is a valid key part of a plurality of valid key parts corresponding to a defined number of the at least some of the secret objects. The computer-implemented method also includes combining the valid key parts to obtain a complete key. The computer-implemented method also includes gaining access to a resource controlled by a second entity based on the complete key.

In some implementations, the computer-implemented method further includes protecting secrecy of the complete key on the network-addressable device, and where the protecting secrecy includes applying a security policy that prevents the network-addressable device from transmitting the complete key to any other device within the system.

According to another example embodiment, there is provided a computer-implemented method for restricting access to a resource controlled by an entity. The method includes generating a key and splitting it into N key parts (where N is an integer greater than two). The method also includes encrypting the N key parts. The method also includes transmitting, over a network, to a device controlled by another entity: the N encrypted key parts; and identifying information for N secret objects expected to be visible within a geographic incident area. Each of the N encrypted key parts is decryptable based on at least one video analytics-discernable object attribute for each respective secret object of the N secret objects. The method also includes allowing the another entity to access the resource only by presentation of a complete key formed from decrypted versions of less than all of the N key parts.

According to yet another example embodiment, there is provided a system that includes a plurality of communicatively connected devices at least partly controlled by a first entity. One or more of the communicatively connected devices collectively or separately include a network-addressable device having an input configured to receive identifying information for a plurality of secret objects expected to be visible within a geographic incident area. The communicatively connected devices also collectively or separately include at least one camera configured to capture at least one image of at least some of the secret objects. The one or more of the communicatively connected devices are collectively or separately configured to carry out analytics on the captured at least one image to obtain a plurality of sets of object attributes. Each set includes at least one object attribute for each of a corresponding one of the at least some of the secret objects. The one or more of the communicatively connected devices are also configured to (for each of the sets of object attributes): obtain an unverified key part via decryption using the respective set, and verify whether the unverified key part is a valid key part of a plurality of valid key parts corresponding to a defined number of the at least some of the secret objects. The one or more of the communicatively connected devices are also configured to combine the valid key parts to obtain a complete key. The one or more of the communicatively connected devices are also configured to gain access to a resource controlled by a second entity based on the complete key.

Each of the above-mentioned embodiments will be discussed in more detail below, starting with example system and device architectures of the system in which the embodiments may be practiced, followed by an illustration of processing blocks for achieving an improved technical method, system and computer program product for secure communication between different agencies in an incident area. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

The term "object" as used herein is understood to have the same meaning as would normally be given by one skilled in the art of video analytics, and examples of objects may include humans, vehicles, animals, buildings, signs, etc.

Further advantages and features consistent with this disclosure will be set forth in the following detailed description, with reference to the figures.

Referring now to the drawings, and in particular FIG. 1 which is a block diagram of communicatively connected systems 100 within which methods in accordance with example embodiments can be carried out. Included within the illustrated communicatively connected systems 100 are: "SYSTEM A" 101 (also herein interchangeably referred to as a "first system", and which may be operated by one of a plurality of entities such as, for example, a public security agency, a private security agency, etcetera); and "SYSTEM B" 102 (also herein interchangeably referred to as a "second system", and which may be operated by a different one of the aforementioned plurality of entities such as, for example, a different public security agency, a different private security agency, etcetera). Various system parts (and sub-parts of those parts) are shown in relation to SYSTEM A; however, for convenience of illustration, they are not shown in relation of SYSTEM B. Although SYSTEM A and SYSTEM B have different roles in relation to example embodiments herein described, it will be understood that SYSTEM B may have similar or the same system parts (for example, devices, hardware, software, etc.) as those herein shown and described in relation to SYSTEM A.

Regarding the first system 101, this includes a plurality of camera devices $103_1$-$103_Q$ (hereinafter interchangeably referred to as "cameras $103_1$-$103_Q$" when referring to all of the illustrated cameras, or "camera 103" when referring to any individual one of the plurality) where Q is any suitable integer greater than one. The first system 101 also includes a plurality of electronic computing devices $104_1$-$104_M$ (hereinafter interchangeably referred to as "electronic computing devices $104_1$-$104_M$" when referring to all of the illustrated computing devices, or "electronic computing device 104" when referring to any individual one of the plurality) where M is any suitable integer greater than one. The first system 101 also includes a server system 108.

In some example embodiments, the electronic computing device 104 is a personal computer system; however in other example embodiments the electronic computing device 104 is a selected one or more of the following: a handheld device such as, for example, a tablet, a phablet, a smart phone or a personal digital assistant (PDA); a laptop computer; a smart television; a two-way radio; and other suitable devices. With respect to the server system 108, this could comprise a single physical machine or multiple physical machines. It will be understood that the server system 108 need not be contained within a single chassis, nor necessarily will there be a single location for the server system 108. As will be appreciated by those skilled in the art, at least some of the functionality of the server system 108 can be implemented within the electronic computing device 104 rather than within the server system 108.

The electronic computing device 104 communicates with the server system 108 through one or more networks. These networks can include the Internet, or one or more other public/private networks coupled together by network switches or other communication elements. The network(s) could be of the form of, for example, client-server networks, peer-to-peer networks, etc. Data connections between the electronic computing device 104 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the electronic computing device 104 and the server system 108 are within the same Local Area Network (LAN). In some examples, the electronic computing device 104 communicates directly or indirectly with other parts of first system 101 besides the server system 108. For instance, it is contemplated that the electronic computing device 104 may communicate directly or indirectly with one or more of the cameras 103₁-103_Q.

Figure 2:
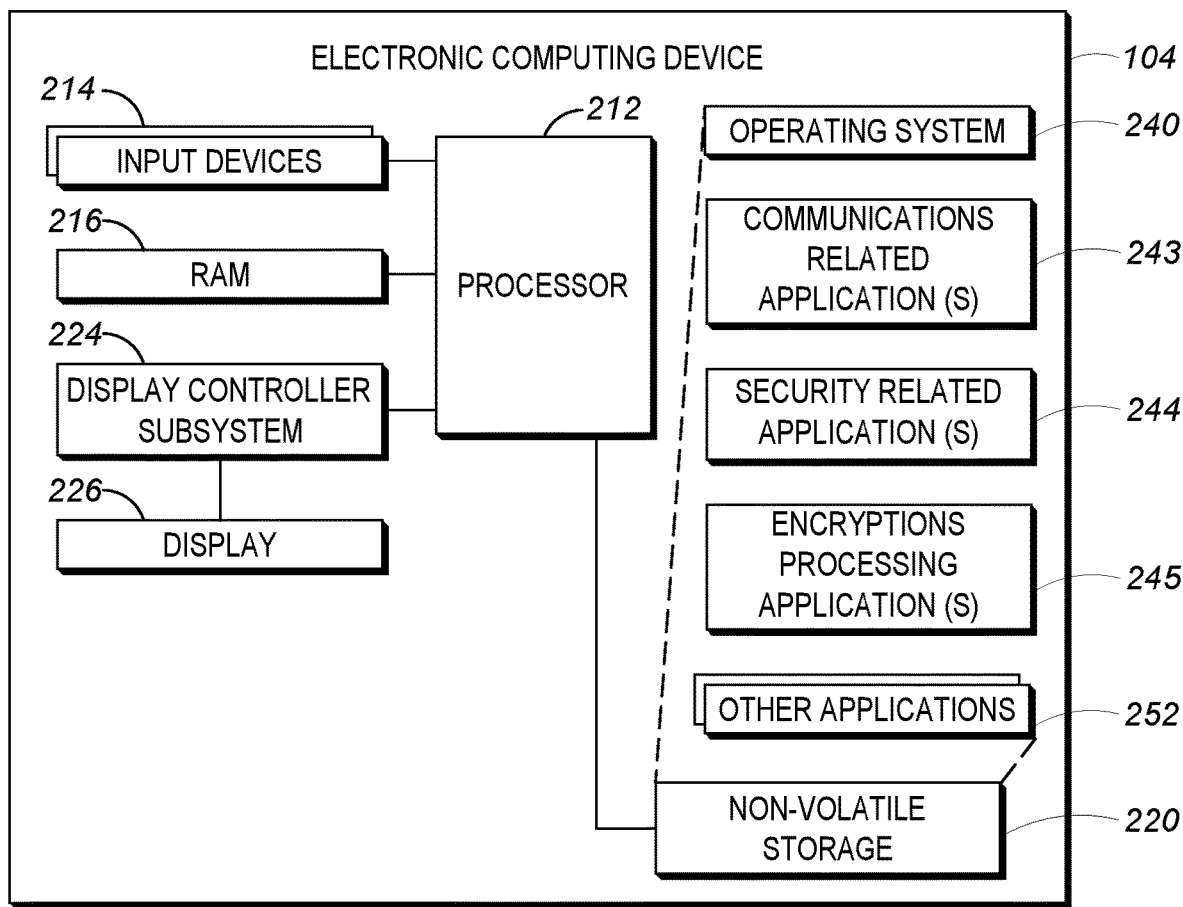
FIG. 2 is a block diagram showing more detail of one of the electronic computing devices shown in FIG. 1.

More details of the electronic computing device 104 are shown in FIG. 2. The electronic computing device 104 includes at least one processor 212 that controls the overall operation of the device. The processor 212 interacts with various subsystems such as, for example, input devices 214 (such as a selected one or more of a keyboard, mouse, touch pad, roller ball and voice control means, for example), random access memory (RAM) 216, non-volatile storage 220, display controller subsystem 224 and other subsystems. The display controller subsystem 224 interacts with display 226 and it renders graphics and/or text upon the display 226.

Still with reference to the electronic computing device 104 shown in FIG. 2, operating system 240 and various software applications used by the processor 212 are stored in the non-volatile storage 220. The non-volatile storage 220 is, for example, one or more hard disks, solid state drives, or some other suitable form of computer readable medium that retains recorded information after the electronic computing device 104 is turned off. Regarding the operating system 240, this includes software that manages computer hardware and software resources of the electronic computing device 104 and provides common services for computer programs. Also, those skilled in the art will appreciate that the operating system 240, communications related application(s) 243, security related application(s) 244, encryptions processing application(s) 245, and other applications 252, or parts thereof, may be temporarily loaded into a volatile store such as the RAM 216. The processor 212, in addition to its operating system functions, can enable execution of the various software applications on the electronic computing device 104.

Regarding the communications related application(s) 243, these can include any one or more of, for example, an email application, an instant messaging application, a talk group application, etc.

Regarding the security related application(s) 244, this may include, for example, a Video Management Software (VMS) application to enable a user of the electronic computing device to carry out actions related to providing input in relation to images, live video and video recordings (such as, for instance, input to facilitate annotating or selectively exporting, to incident report folders, video footage captured by a plurality of video security cameras). The security related application(s) 244 may also include other applications including for, example, a physical security application, an evidence management application, etc.

Regarding the encryptions processing application(s) 245, this is one or more applications that operate as a client-side cooperative counterpart to encryptions processing module 193 (FIG. 1) of the server system 108 which will be subsequently herein discussed in more detail.

Referring once again to FIG. 1, the server system 108 includes several software components for carrying out other functions of the server system 108. For example, the server system 108 includes a media server module 168. The media server module 168 handles client requests related to storage and retrieval of security video taken by camera devices 103₁-103_q in the first system 101. In some examples, the media server module 168 may carry out other functions in relation to other forms of media communicated to the electronic computing device 104 from the server system 108. The server system 108 also includes server-side analytics module(s) 194 which can include, in some examples, any suitable one of known commercially available software that carry out computer vision related functions (complementary to any video analytics performed in the cameras) as understood by a person of skill in the art. The server-side analytics module(s) 194 can also include software for carrying out non-video analytics, such as audio analytics that may, for example, convert spoken words into text, carry out audio emotion recognition, etc. The server system 108 also includes an encryptions processing module 193 for carrying out some or all of encryption/decryption functions implemented within the first system 101.

The server system 108 also includes a number of other software components 176. These other software components will vary depending on the requirements of the server system 108 within the overall system. As just one example, the other software components 176 might include special test and debugging software, or software to facilitate version updating of modules within the server system 108. The other software components 176 may also include one or more server-side modules that provide cooperative counterpart functionality to one or more of the communications related application(s) 243 and the security related application(s) 244 previously herein described.

Regarding the at least one storage device 190, this comprises, for example, one or more databases 191 which may facilitate the organized storing of recorded security video, non-video sensor data, incident-related data, etcetera in accordance with example embodiments. The one or more databases 191 may also contain metadata related to, for example, the recorded security video that is storable within one or more storages. The one or more databases 191 may also contain other types of metadata besides video metadata. Examples of metadata other than video metadata, that may be stored in the one or more databases 191, include audio metadata, Global Positioning System (GPS) location metadata, etcetera.

Still with reference to FIG. 1, the camera 103 is operable to capture a plurality of images and produce image data representing the plurality of captured images. The camera 103, an image capturing device, may include, for example, a security video camera, a mobile video camera wearable by a person (for instance, a person employed by the agency operating SYSTEM A), or some other type of fixed or mobile camera. Furthermore, it will be understood that the first system 101 includes any suitable number of cameras (i.e. Q is any suitable integer greater than zero). In at least one example where the camera 103 is a wearable mobile video camera, the hardware and software components of both the camera 103 and the electronic computing device 104 may be all contained within a single device housing. In at least one other example where the camera 103 is a fixed video camera, again the hardware and software components of both the camera 103 and the electronic computing device 104 may be all contained within a single device housing.

Figure 3:
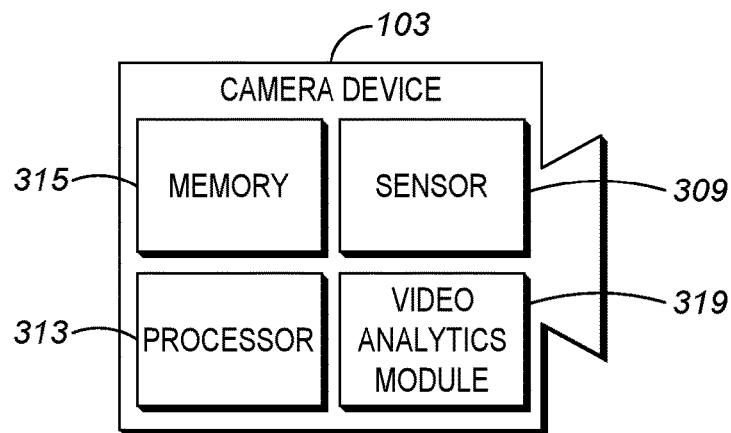
FIG. 3 is a block diagram showing more detail of one of the cameras shown in FIG. 1.

More details of the camera 103 are shown in FIG. 3. The camera 103 includes an image sensor 309 for capturing a plurality of images. The camera 103 may be a digital video camera and the image sensor 309 may output captured light as a digital data. For example, the image sensor 309 may be a CMOS, NMOS, or Charge-Couple Device (CCD). In some embodiments, the camera 103 may be an analog camera connected to an encoder. The illustrated camera 103 may be a 2D camera; however use of a structured light 3D camera, a time-of-flight 3D camera, a 3D Light Detection and Ranging (LiDAR) device, a stereo camera, or any other suitable type of camera within the first system 101 is contemplated. In some example embodiments, the camera 103 may be a fixed video camera installed proximate or within a geographic incident area such that a Field Of View (FOV) of the fixed video camera is at least partly overlapping the geographic incident area. Also, when such a fixed video camera is used in this manner, it is contemplated that, for instance, a command to pan, tilt or zoom at the fixed video camera may be received to suitably adjust the FOV, prior to the fixed video camera being operated to capture the at least one image.

The image sensor 309 may be operable to capture light in one or more frequency ranges. For example, the image sensor 309 may be operable to capture light in a range that substantially corresponds to the visible light frequency range. In other examples, the image sensor 309 may be operable to capture light outside the visible light range, such as in the infrared and/or ultraviolet range. In other examples, the camera 103 may have characteristics such that it may be described as being a "multi-sensor" type of camera, such that the camera 103 includes pairs of two or more sensors that are operable to capture light in different and/or same frequency ranges.

The camera 103 may be a dedicated camera. It will be understood that a dedicated camera herein refers to a camera whose principal features is to capture images or video. In some example embodiments, the dedicated camera may perform functions associated with the captured images or video, such as but not limited to processing the image data produced by it or by another camera. For example, the dedicated camera may be a security camera, such as any one of a pan-tilt-zoom camera, dome camera, in-ceiling camera, box camera, and bullet camera.

Additionally, or alternatively, the camera 103 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, physical access control device, video game console or controller.

The camera 103 includes one or more processors 313, one or more video analytics modules 319, and one or more memory devices 315 coupled to the processors and one or more network interfaces. Regarding the video analytics module 319, this generates metadata outputted to the server system 108. The metadata can include, for example, records which describe various detections of objects such as, for instance, pixel locations for the detected object in respect of a first record and a last record for the camera within which the respective metadata is being generated.

Regarding the memory device 315 within the camera 103, this can include a local memory (such as, for example, a random access memory and a cache memory) employed during execution of program instructions. Regarding the processor 313, this executes computer program instructions (such as, for example, an operating system and/or software programs), which can be stored in the memory device 315.

In various embodiments the processor 313 may be implemented by any suitable processing circuit having one or more circuit units, including a digital signal processor (DSP), graphics processing unit (GPU) embedded processor, a visual processing unit or a vison processing unit (both referred to herein as "VPU"), etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example. A system on a chip (SOC) implementation is also common, where a plurality of the components of the camera 103, including the processor 313, may be combined together on one semiconductor chip. For example, the processor 313, the memory device 315 and the network interface of the camera 103 may be implemented within a SOC. Furthermore, when implemented in this way, a general purpose processor and one or more of a GPU or VPU, and a DSP may be implemented together within the SOC.

In various example embodiments, the memory device 315 coupled to the processor 313 is operable to store data and computer program instructions. The memory device 315 may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device 315 may be operable to store in memory (including store in volatile memory, non-volatile memory, dynamic memory, etc. or any combination thereof).

As shown in FIG. 1, the camera 103 is coupled to the server system 108. In some examples, the camera 103 is coupled to the server system 108 via one or more suitable networks. These networks can include the Internet, or one or more other public/private networks coupled together by network switches or other communication elements. The network(s) could be of the form of, for example, client-server networks, peer-to-peer networks, etc. Data connections between the camera 103 and the server system 108 can be any number of known arrangements, examples of which were previously herein detailed. In at least one example embodiment, the camera 103 and the server system 108 are within the same Local Area Network (LAN). In some examples, the camera 103 may be coupled to the server system 108 in a more direct manner than as described above.

Figure 4:
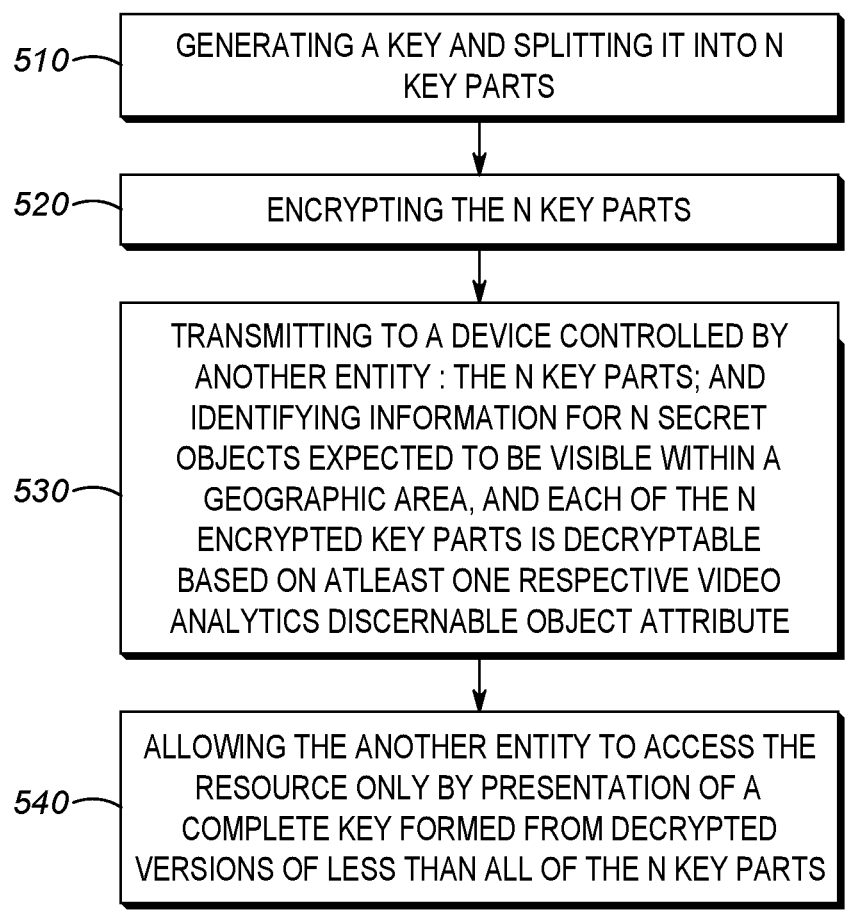
FIG. 4 is a flow chart illustrating a first computer-implemented method in accordance with an example embodiment.
Figure 6:
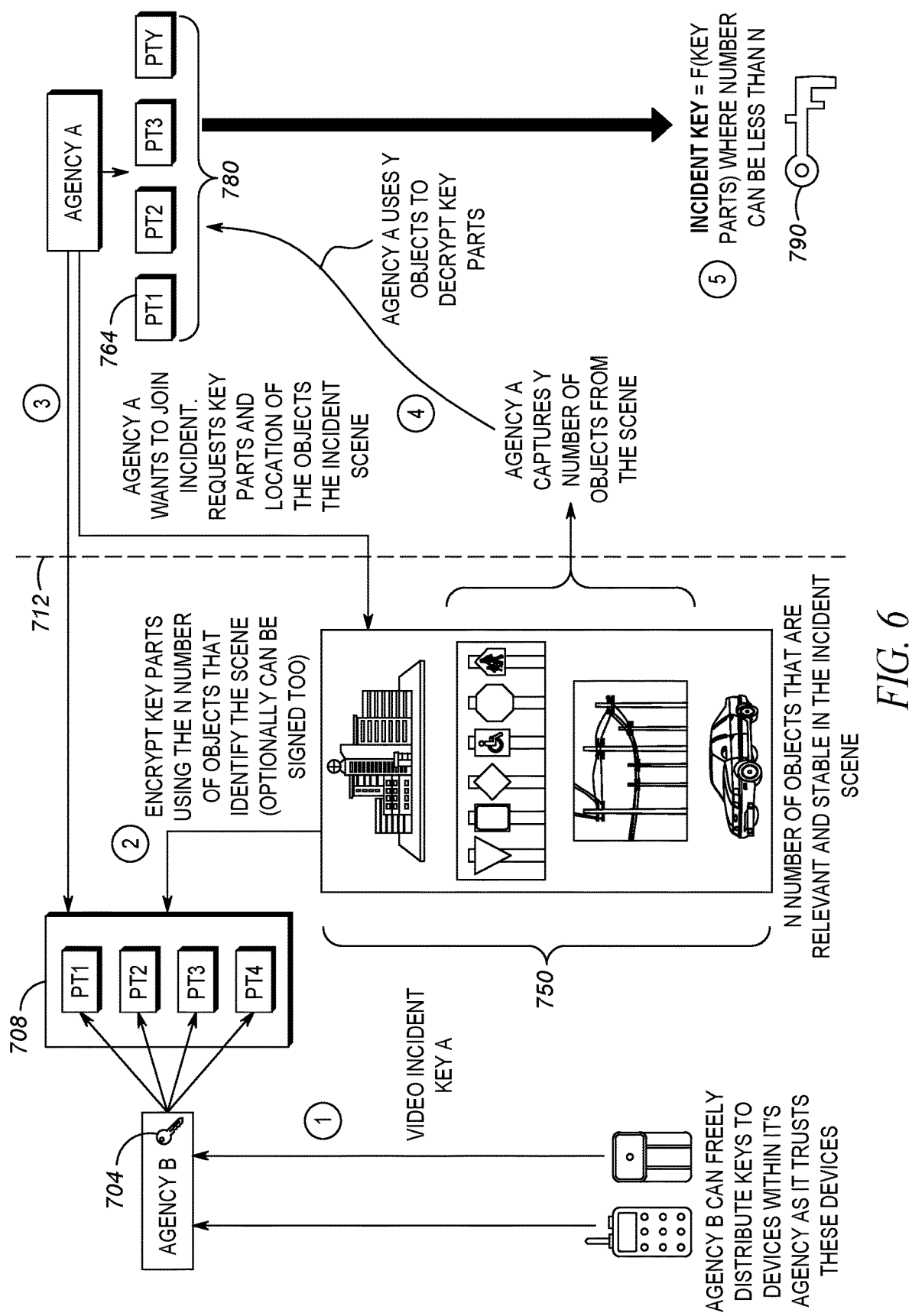
FIG. 6 is a block diagram illustrating key part encryption, exchange and decryption in accordance with an example embodiment.

Reference is now made to FIGS. 4 and 6. FIG. 4 is a flow chart illustrating a method 500 of key part generation (and associated use) in accordance with an example embodiment. The illustrated method 500 includes generating (510) a key and splitting that generated key into N key parts (where N is an integer greater than two). For example, key 704 in FIG. 6 generated by AGENCY B is split into key parts 708.

Next the illustrated method 500 of FIG. 4 includes encrypting (520) the N key parts. Each of these above-mentioned actions (i.e. the generating 510 and the encrypting 520) may be performed by a same computing device (for example, one computing device within the SYSTEM B 102 of FIG. 1). Alternatively, each of the generating 510 and the encrypting 520 may be performed by a different computing device (for example, different computing devices within the SYSTEM B 102). A same number of objects as key parts (i.e. N) may be selected in conjunction with the encrypting. For example, in FIG. 6 N objects 750 are selected in conjunction with the encrypting.

Next the illustrated method 500 includes transmitting (530) certain data and information to a device controlled by another entity (i.e. a different entity than the one that encrypted the key parts such as, for example, AGENCY A on the right side of dashed line 712 in FIG. 6). This transmitted data and information includes: some number K of the encrypted key parts (K being between and including N and some minimum number G>1); and identifying information (for example, object classification information and/or geolocation information) for those secret objects (may be equal or less than N) that the agency is provided information about (and which are expected to be visible within a geographic incident area). Object classifications of the secret objects may include, for example, one or more of the following: vehicles, pedestrian conveyances, buildings, weapons and signage, etc. Also, where G<K<N, it may be that AGENCY A sees all K objects, but only decrypts G objects.

Continuing on, it will be understood that each of the N encrypted key parts is decryptable based on at least one video analytics-discernable object attribute for each respective secret object of the N secret objects. Also, in terms of an example of the transmitting 530, and drawing illustrative reference to FIG. 1, transmitting may occur from a transmitting device within the SYSTEM B 102, over one or more networks, to one or more of the server system 108 and the electronic computing devices $104_1$-$104_M$.

Finally, the illustrated method 500 also includes allowing (540) the another entity access to the resource only by presentation of a complete key formed from decrypted versions of less than all of the N key parts. In this manner, an aspect of the method 500 takes on the Shamir's secret sharing algorithm concept where the key can be reconstructed based on G parts (where G<N). For example, using complete key (incident key) 790 shown in FIG. 6 (obtained from combining key parts 780) AGENCY A is able to obtain access to the resource. Any suitable type of resource is contemplated, and examples of resources may include: a non-public talk group for communications amongst talk group members; shareable secure data; access to a door or other physical resource; etc.

Figure 5:
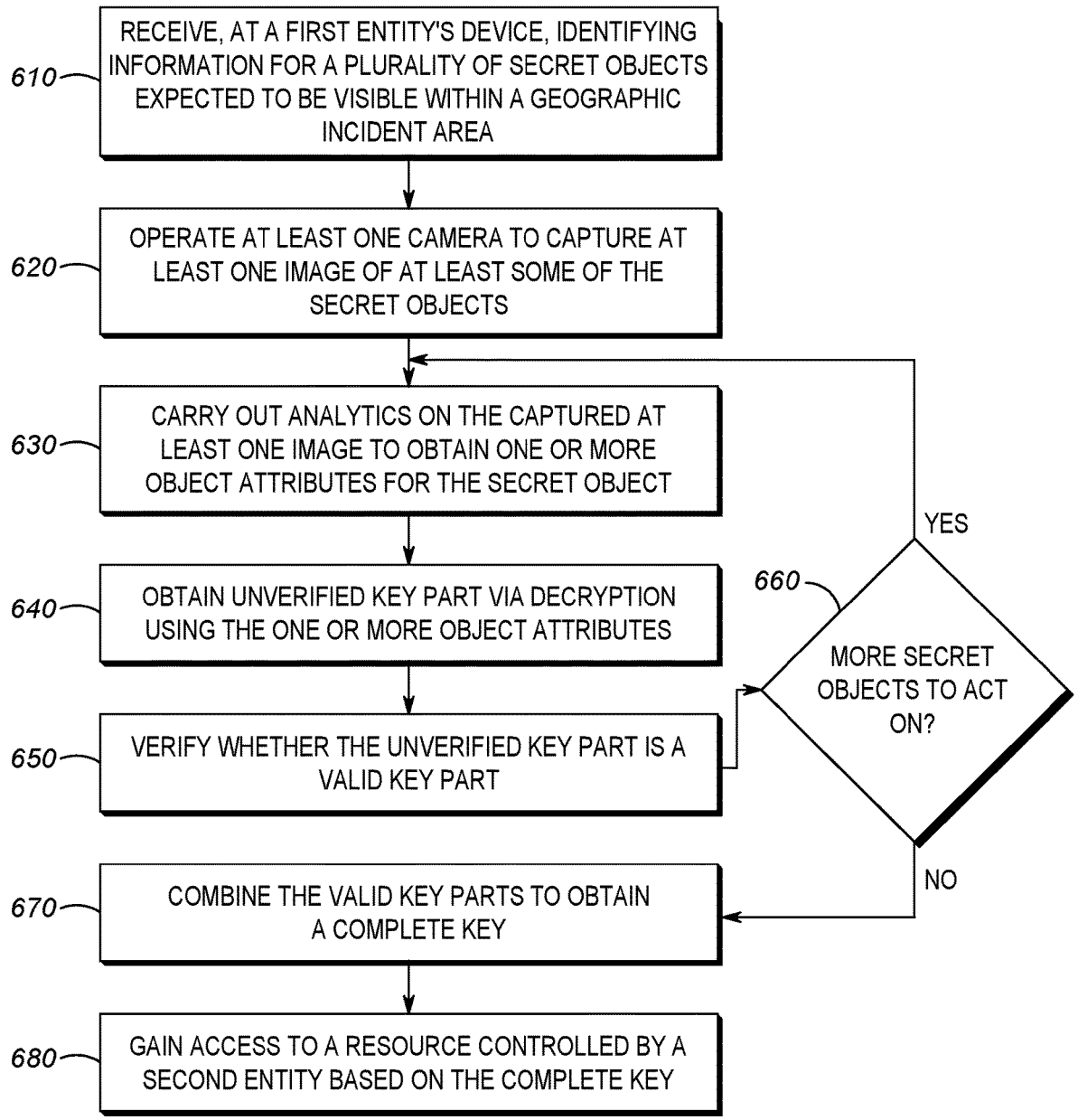
FIG. 5 is a flow chart illustrating a second computer-implemented method in accordance with an example embodiment.

Complementary to the illustrated method 500 is a method 600 for restricting access to a resource controlled by an entity. FIG. 5 is a flow chart illustrating the method 600. The illustrated method 600 includes receiving (610), at a first entity's device (for example, the electronic computing device 104 shown in FIG. 1), identifying information for a plurality of secret objects (for example, some number of various objects 750 shown in FIG. 6) expected to be visible within a geographic incident area.

Next the illustrated method 600 of FIG. 5 includes operating (620) at least one camera (for example, one or more of the camera devices $103_1$-$103_q$ shown in FIG. 1) to capture at least one image of at least some of the objects 750 (FIG. 6).

Next the illustrated method 600 of FIG. 5 includes carrying out analytics (630) on the captured at least image to obtain one or more object attributes for a first of the secret objects. For example, the analytics module(s) 194 (FIG. 1) may carry out analytics to obtain one or more object attributes for a first of the objects 750 (FIG. 6). Any suitable object attribute is contemplated, and object attributes can fall within one or more types of different categories, examples of which include: color, shape and sub-object classification.

Next the illustrated method 600 includes obtaining (640) a first unverified key part via decryption using the one or more object attributes (i.e. from the action 630). For example, key part 764 (shown in FIG. 6) is obtained.

Next the illustrated method 600 includes verifying (650) whether the unverified key part is a valid key part. Different implementations of the action 650 are contemplated. For example the action 650 may include: carrying out a comparison between a reference signature and a portion of the unverified key part; and generating a confirmation that the unverified key part is a valid key part only when the comparison produces a match.

Next the illustrated method 600 includes decision action 660. If there are no more secret objects to act on (here "no more secret objects" can mean either all the object attributes from the objects corresponding to the extent of the shared information have been obtained, or alternatively it can also mean that the minimum number of valid key parts needed for the complete key have been obtained), then action 670 follows. Otherwise the actions 630, 640 and 650 are repeated until there is no more shared information to act on (i.e. all information shared between the sending agency and the receiving agency has been acted on or the minimum number of valid key parts needed for the complete key have been obtained).

Next the illustrated method 600 includes combining (670) the valid key parts 780 (FIG. 6) to obtain the complete key 790 (FIG. 6). (To simplify the illustration of the method 600, an implicit assumption is made, namely that the minimum number of valid key parts are successfully obtained.)

Finally, the illustrated method 600 also includes gaining access (680) to a resource controlled by a second entity based on the complete key 790 (FIG. 6).

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etcetera, and decrypt an encrypted key part based on one or more video analytics-discernable object attributes of a secret object, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method comprising:
electronically receiving, at a data-connected input of a network-addressable device, identifying information for a plurality of secret objects expected to be visible within a geographic incident area, wherein the network-addressable device forms a part of a system, at least partly controlled by a first entity, that includes the network-addressable device and at least one camera;
operating the at least one camera to capture at least one image of at least some of the secret objects;
carrying out one or more analytics on the captured at least one image to obtain a plurality of sets of object attributes, wherein each set includes at least one object attribute for each of a corresponding one of the at least some of the secret objects;
for each of the sets of object attributes:
  obtaining an unverified key part via decryption using the respective set, and verifying whether the unverified key part is a valid key part of a plurality of valid key parts corresponding to a defined number of the at least some of the secret objects;
combining the valid key parts to obtain a complete key; and gaining access to a resource controlled by a second entity based on the complete key.

2. The computer-implemented method of claim 1 wherein the identifying information includes object classification information and geolocation information for the secret objects.

3. The computer-implemented method of claim 1 wherein object classifications of the secret objects includes one or more of the following: vehicles, pedestrian conveyances, buildings, weapons and signage.

4. The computer-implemented method of claim 1 wherein at least one of the first and second entity is a public security agency.

5. The computer-implemented method of claim 1 wherein the verifying includes:
carrying out a comparison between a reference signature and a portion of the unverified key part, and
generating a confirmation that the unverified key part is a valid key part only when the comparison produces a match.

6. The computer-implemented method of claim 1 wherein the at least one camera is a mobile video camera worn by a person employed by the first entity.

7. The computer-implemented method of claim 1 wherein the at least one camera is a fixed video camera installed proximate or within the geographic incident area such that a Field Of View (FOV) of the fixed video camera is at least partly overlapping the geographic incident area.

8. The computer-implemented method of claim 7 further comprising receiving a command to pan, tilt or zoom at the fixed video camera, prior to the operating the fixed video camera to capture the at least one image.

9. The computer-implemented method of claim 1 wherein the resource is one of the following:
a non-public talk group for communications amongst talk group members;
shareable secure data; and
access to a door or other physical resource.

10. The computer-implemented method of claim 1 wherein at least some individual object attributes amongst the sets of object attributes fall within one or more of the following categories: color, shape and sub-object classification.

11. The computer-implemented method of claim 1 wherein the captured at least one image is a plurality of images.

12. The computer-implemented method of claim 1 further comprising transmitting the complete key from the network-addressable device to at least one another network-addressable device of the system.

13. The computer-implemented method of claim 1 further comprising protecting secrecy of the complete key on the network-addressable device, and
wherein the protecting secrecy includes applying a security policy that prevents the network-addressable device from transmitting the complete key to any other device within the system.

14. A system comprising:
a plurality of communicatively connected devices at least partly controlled by a first entity, and one or more of the communicatively connected devices collectively or separately including:
a network-addressable device having a data-connected input configured to electronically receive identifying information for a plurality of secret objects expected to be visible within a geographic incident area, and
at least one camera configured to capture at least one image of at least some of the secret objects, and
the one or more of the communicatively connected devices being collectively or separately configured to:
carry out one or more analytics on the captured at least one image to obtain a plurality of sets of object attributes, wherein each set includes at least one object attribute for each of a corresponding one of the at least some of the secret objects,
for each of the sets of object attributes:
obtain an unverified key part via decryption using the respective set, and verify whether the unverified key part is a valid key part of a plurality of valid key parts corresponding to a defined number of the at least some of the secret objects,
combine the valid key parts to obtain a complete key, and
gain access to a resource controlled by a second entity based on the complete key.

15. The system of claim 14 wherein the at least one camera and the network-addressable device are contained within a same single housing.

16. The system of claim 14 wherein the at least one camera is a fixed video camera installed proximate or within the geographic incident area such that a Field Of View (FOV) of the fixed video camera is at least partly overlapping the geographic incident area.

17. The system of claim 16 further wherein the fixed video camera is configured to receive a command to effect a pan, tilt or zoom movement, prior to operation of the fixed video camera to capture the at least one image.

* * * * *